(12) United States Patent
VanderVeen

(10) Patent No.: US 7,832,815 B2
(45) Date of Patent: Nov. 16, 2010

(54) TRACK ROLLER ASSEMBLY AND MACHINE USING SAME

(75) Inventor: Jeffrey S. VanderVeen, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 12 days.

(21) Appl. No.: 12/255,875

(22) Filed: Oct. 22, 2008

(65) Prior Publication Data

US 2010/0096196 A1    Apr. 22, 2010

(51) Int. Cl.
*B60B 9/00*    (2006.01)
*B60B 19/00*    (2006.01)

(52) U.S. Cl. ...................... 305/136; 305/119

(58) Field of Classification Search ......... 305/121–122, 305/124, 127–130, 136, 138
See application file for complete search history.

(56) References Cited

U.S. PATENT DOCUMENTS

| | | | | |
|---|---|---|---|---|
| 1,796,533 A | * | 3/1931 | Pearson | 180/9.64 |
| 2,823,079 A | * | 2/1958 | Williams | 305/136 |
| 2,915,326 A | | 12/1959 | Mason | |
| 3,073,657 A | | 1/1963 | Oxford | |
| 3,088,782 A | * | 5/1963 | Conlan | 384/563 |
| 3,116,957 A | * | 1/1964 | Fikse | 384/381 |
| 3,147,048 A | * | 9/1964 | Johnson et al. | 384/584 |
| 3,736,997 A | * | 6/1973 | Bottorf | 177/145 |
| 3,773,393 A | | 11/1973 | Story et al. | |
| 3,797,895 A | | 3/1974 | Tomizawa | |
| 3,866,985 A | * | 2/1975 | Whitehurst | 384/418 |
| 3,871,719 A | * | 3/1975 | Boggs | 305/136 |
| 3,955,646 A | | 5/1976 | Luebkemann | |
| 4,030,178 A | | 6/1977 | Luebkemann | |
| 4,083,610 A | * | 4/1978 | Kruchowski | 305/139 |
| 4,209,205 A | | 6/1980 | Gregg et al. | |
| 4,815,794 A | * | 3/1989 | Becker et al. | 305/119 |
| 5,178,470 A | * | 1/1993 | Unick | 384/276 |
| 5,302,012 A | * | 4/1994 | Dester et al. | 305/193 |
| 5,669,680 A | | 9/1997 | Bertoni | |
| 7,213,894 B2 | | 5/2007 | Yamamoto et al. | |
| 2010/0007205 A1 | * | 1/2010 | Vanderveen | 305/119 |

* cited by examiner

*Primary Examiner*—Jason R Bellinger
(74) *Attorney, Agent, or Firm*—Jonathan V. Trousdale

(57) ABSTRACT

A track roller assembly for a track-type machine such as an excavator or a tractor includes an outer surface with no fluid ports and an inner surface free from any fluids. The track roller includes a shaft resting on self-lubricated bushings, which include a substrate that has lubricating properties, such as a substrate that carries a solid lubricant. The track roller assembly also includes a collar and a retention plate on both sides of the shaft.

20 Claims, 4 Drawing Sheets

TRACK ROLLER ASSEMBLY AND MACHINE USING SAME

TECHNICAL FIELD

The present disclosure relates to the field of track type machines, and more specifically, to track roller assemblies.

BACKGROUND

Track rollers used on track-type machines such as excavators and tractors are subject to extremely high levels of stress and wear due to the conditions that track-type machines frequently operate under. While operating in extreme conditions, such as hilly and rocky terrains, track rollers are more prone to getting damaged. Consequently, such track rollers are plagued with relatively high service costs, short wear life and numerous other problems with their operation. One of such problems arises from the need to constantly keep the track rollers well lubricated. Operating track-type machines on difficult terrains frequently causes the leakage of lubrication fluid from the bearing assembly of the track roller into other areas of the track roller. This results in increased service costs for repairing the leak or replacing the entire track roller assembly. Other problems associated with track roller designs in the past include constructing assemblies with high part counts, complex manufacturing processes and handling liquid lubricants during construction.

U.S. Pat. No. 3,773,393 discusses an example of a liquid lubricated track roller assembly design. A pair of laterally spaced end caps receive a shaft and serve to support the shaft within a dead-end bore which is defined by a cylindrical inner wall and an end wall. A bearing assembly is mounted in the bore and interposed between the end cap and the shaft and includes a sleeve-type cylindrical bushing fixedly supported by the inner wall and a disc-type thrust washer secured to the end wall. A vertically extending channel formed within the end wall receives a liquid lubricant, such as oil that may be introduced to the roller assembly through a port. Although this patent teaches the use of bushings and thrust washers, it fails to address the longstanding problem of preventing lubricating fluid leaks that are prone to occur, such as under extreme operating conditions.

SUMMARY

In one aspect of the disclosure a track roller assembly includes a first collar having a first inner wall surface and a first lip; a second collar having a second inner wall surface and a second lip; a shaft having a first end, a second end, and an axis, the first end being disposed within the first collar and the second end being disposed within the second collar; a first retention plate being fixed with respect to the shaft; and a second retention plate being fixed with respect to the shaft. According to this aspect of the disclosure the first lip is restrained from movement along the axis by the first retention plate; the second lip is restrained from movement along the axis by the second retention plate; and the shaft, the first retention plate, and the second retention plate are rotatable relative to the first collar and the second collar.

In another aspect, a method of assembling a track roller assembly is disclosed. The disclosed method includes the steps of press fitting a first bushing to a first cylindrical bore of a first collar, the first collar having a first lip; press fitting a second bushing to a second cylindrical bore of a second collar, the second collar having a second lip; inserting a first end of a shaft into the first cylindrical bore of the first collar to contact a first inner bearing surface of the first bushing, the shaft having an axis; inserting a second end of the shaft into the second cylindrical bore of the second collar to contact a second inner bearing surface of the second bushing; sliding a first retention plate over the first collar until it is in contact with the shaft; sliding a second retention plate over the second collar until it is in contact with the shaft; attaching the first retention plate to the shaft; and attaching the second retention plate to the shaft.

DETAILED DESCRIPTION

Figure 1:
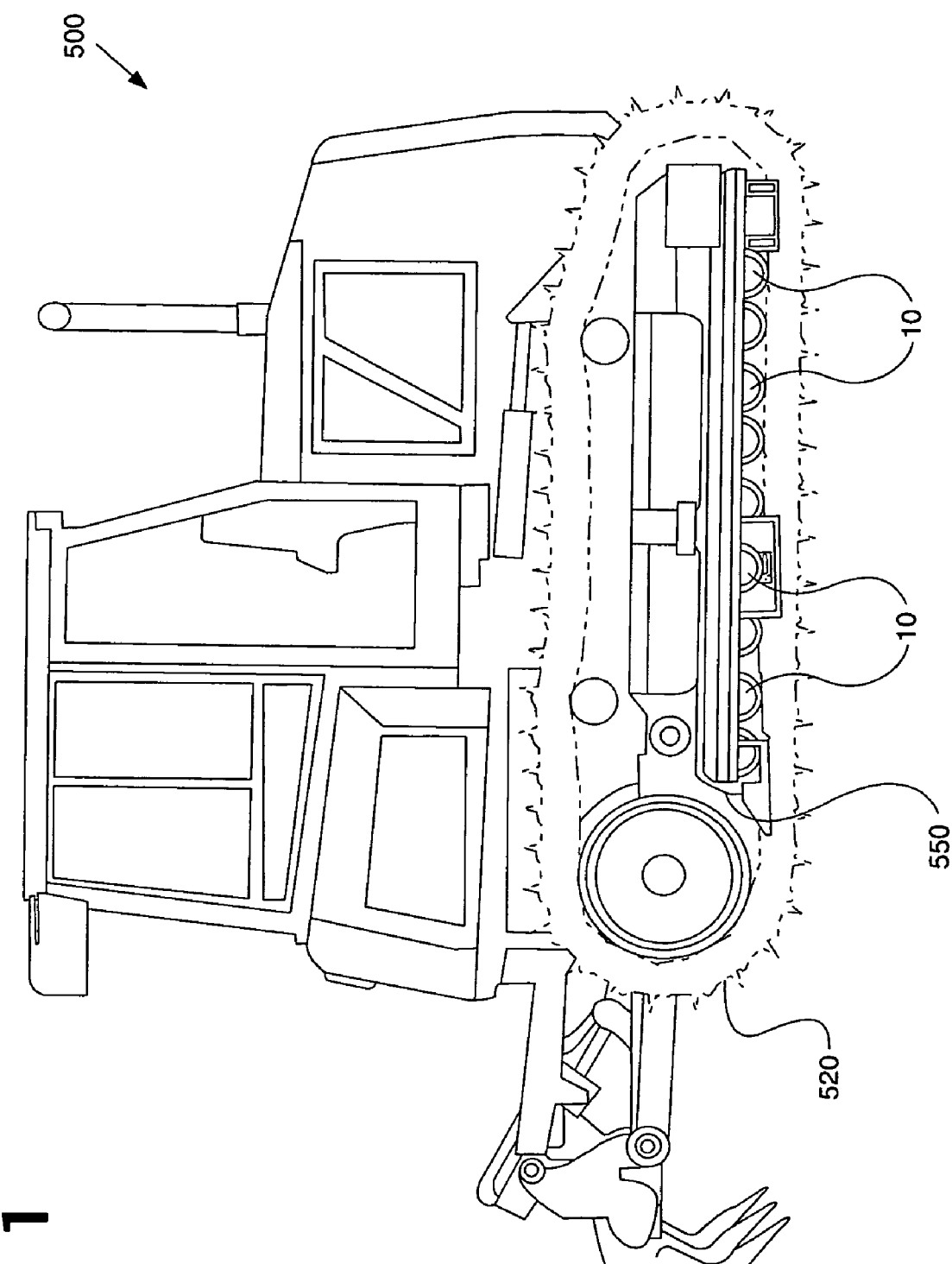
FIG. 1 is a side view of a track-type machine according to the present disclosure.
Figure 2:
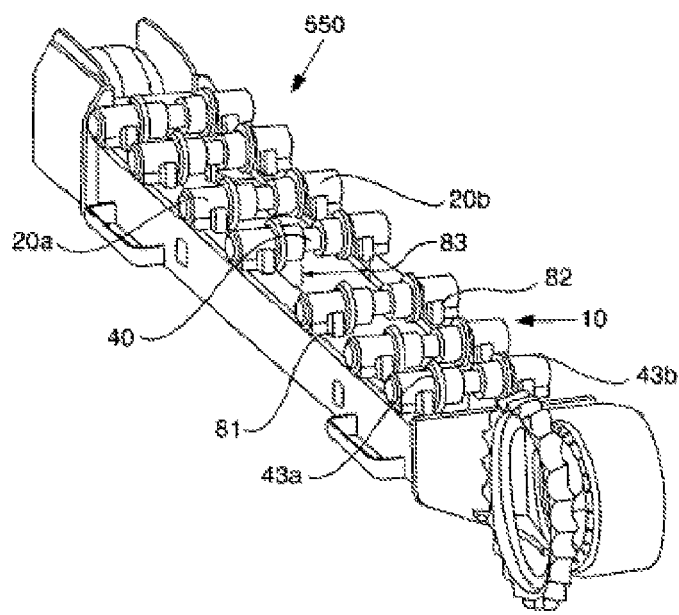
FIG. 2 is a perspective inverted view of the track frame assembly of the track-type machine shown in FIG. 1.

Referring to FIGS. 1 and 2, a track-type machine 500 includes a track 520 that includes a track roller frame assembly 550 and a plurality of track roller assemblies 10 spaced apart along the length of the track 520. The track roller frame assembly 550 includes a first bar 81 and a second bar 82 separated from the first bar 81, by a roller receiving gap 83 that may be determined by the size of each track roller assembly 10.

Figure 3:
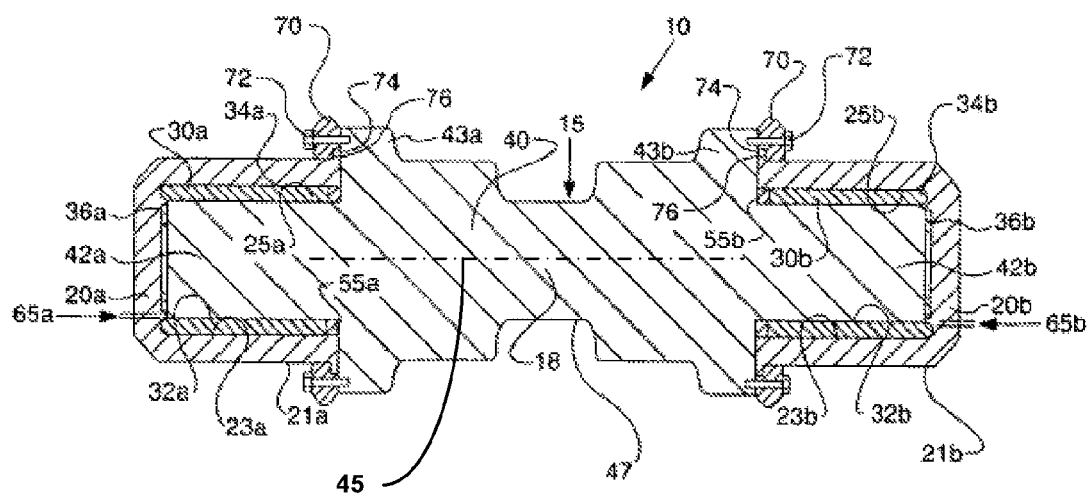
FIG. 3 is a sectioned front view of a track roller from the machine shown in FIG. 1.
Figure 4:
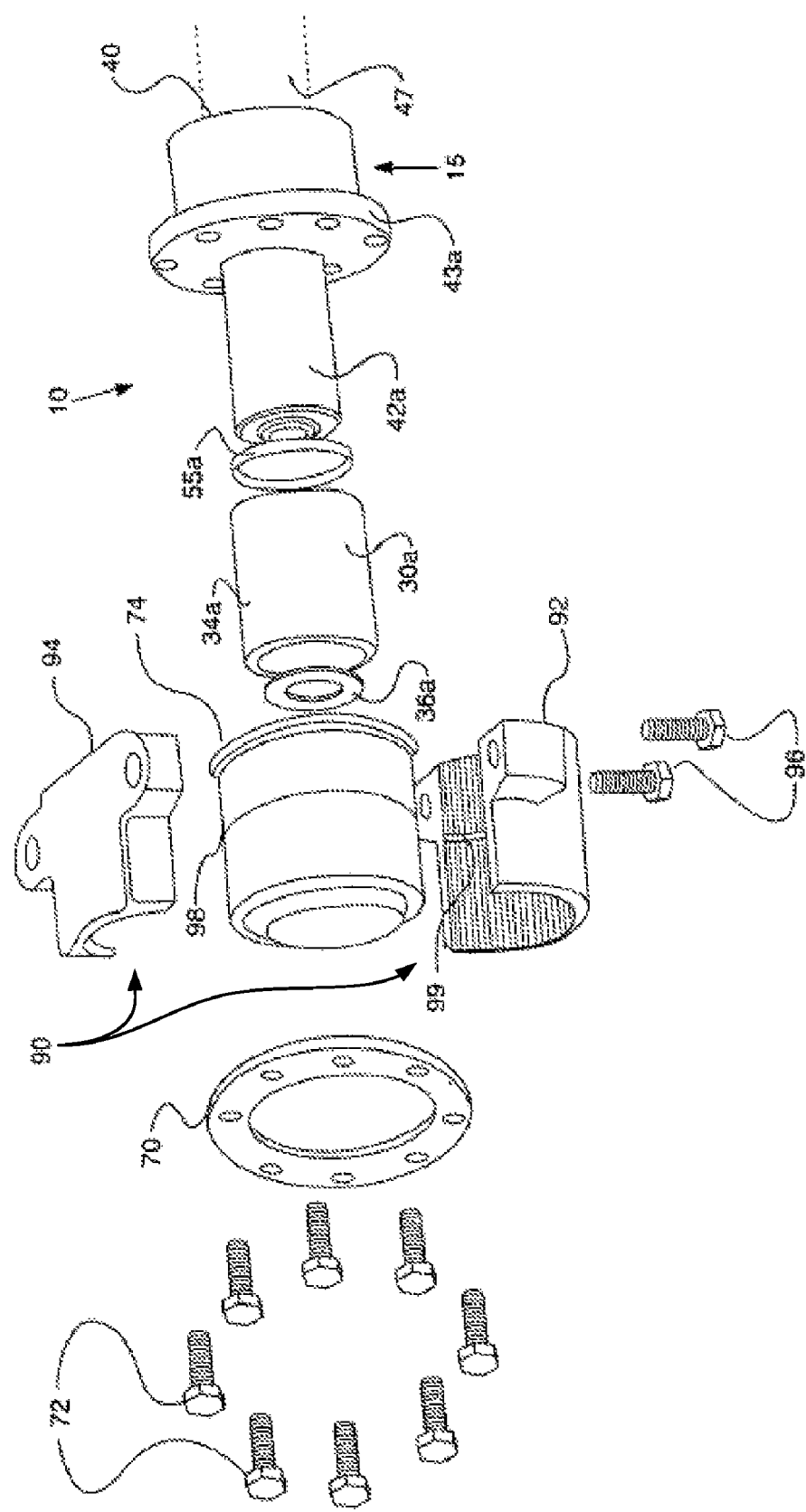
FIG. 4 is an exploded perspective view of one end of the track roller shown in FIG. 3.

Referring also to FIGS. 3 and 4, the illustrated embodiment of the track roller assembly 10 includes a first collar 20a and a second collar 20b. The first collar 20a has a first external surface 21a and a first inner wall surface 23a that defines a first inner cylindrical bore 25a. Similarly, the second collar 20b has a second external surface 21b and a second inner wall surface 23b that defines a second inner cylindrical bore 25b.

The illustrated track roller assembly 10 includes a first self-lubricated bushing 30a, which is received by the first inner cylindrical bore 25a of the first collar 20a. The track roller assembly 10 also includes a second self-lubricated bushing 30b, which is received by the second inner cylindrical bore 25b of the second collar 20b. The first and second self-lubricated bushings 30a, 30b may be tightly fit into the first and second inner cylindrical bores 25a, 25b, respectively and may be inserted into the bores 25a, 25b by press fitting or employing other similar methods that may provide a tight fit. The first self-lubricated bushing 30a has a first inner bearing surface 32a and a first outer surface 34a that may contact the first inner wall surface 23a of the first collar 20a.

Similarly, the second self-lubricated bushing 30b has a second inner bearing surface 32b and a second outer surface 34b that may contact the second inner wall surface 23b of the second collar 20b. The first and second inner wall surfaces 23a, 23b may be scored to inhibit rotational movement of the first and second self-lubricated bushings 30a, 30b relative to the first and second collars 20a, 20b, respectively. In the illustrated embodiment, the self-lubricated bushings 30a, 30b are press fitted into their respective inner cylindrical bores 25a, 25b after the inner wall surfaces 23a, 23b of the first and second collars 20a, 20b have been scored.

In the present disclosure, a self-lubricated bushing means any rotational load supporting member which does not require an external liquid lubricant. A few examples of self-lubricated bushings include Polymeric based lubricated bushings, Epoxy based lubricated bushings, Pellet lubricated bushings, Solid (low friction) lubricated bushings and Graphite based lubricated bushings which may be available at bearing suppliers such as GGB Bearing Technology, RCB Bearing and Lubron Bearing Systems. The first and second self-lubricated bushings 30a, 30b may include a substrate carrying a solid lubricant to provide lubrication on their respective inner bearing surfaces 32a, 32b.

In an exemplary embodiment of the track roller assembly as shown in FIGS. 2, 3 and 4, a shaft 40 has a first end 42a and a second end 42b that are received by the first and second collars 20a, 20b respectively. The first and second ends 42a, 42b of the shaft 40 may contact the first and second inner bearing surfaces 32a, 32b of the self-lubricated bushings 30a, 30b. In one embodiment, there is a clearance gap 65a between the first end 42a of the shaft 40 and the first inner bearing surface 32a of the self-lubricated bushing 30a so that the shaft 40 may rotate relative to the self-lubricated bushing 30a. There may also be a clearance gap 65b between the second end 42b of the shaft 40 and the second inner bearing surface 32b of the self-lubricated bushing 30b. Those skilled in the art will appreciate these gaps may be sufficiently sized to allow the shaft ends 42a, 42b to rotate relative to their respective self-lubricated bushings 30a, 30b.

In the illustrated embodiment, the shaft 40 includes a first rim portion 43a adjacent the first end 42a of the shaft 40 and a second rim portion 43b adjacent the second end 42b of the shaft 40. The rims 43a, 43b are separated by a shaft portion 47 that may have a wide variety of contours, including one that has a reduced diameter compared to the diameter of the first and second rim portions 43a, 43b and another that has a protruding center flange.

In an exemplary embodiment of the disclosure, the track roller assembly 10 includes an annular retention plate 70. The retention plate 70 may be attached to the shaft 40 by any attachment means known in the art. In the illustrated embodiment, the retention plate 70 is bolted to the shaft 40 by a plurality of retention plate bolts 72. As illustrated in FIGS. 3 and 4, first and second collars 20a, 20b include a lip 74. When the retention plate 70 is attached to the shaft 40, the lip 74 is disposed in an annular recess 76 in the retention plate 70. In one embodiment, a friction inhibiting member (not illustrated), such as a self lubricating bushing, may be provided in the annular recess 76 between the lip 74 and the retention plate 70. According to this embodiment, a seal (not illustrated) may also be provided between the retention plate 70 and the respective collar 20a, 20b to keep debris from entering the area that the lip 74 and the retention plate 70 may be in contact, as well as to prevent lubricant, if any, from escaping.

In this manner, the first and second collars 20a, 20b are maintained in close proximity to the shaft 40, while allowing the shaft 40 to rotate independently of the first and second collars 20a, 20b. This may be beneficial, for example, if the first and second bars 81, 82 of the track roller frame assembly 550 are subjected to forces that would tend to increase the size of the roller receiving gap 83.

As illustrated in FIG. 4, a two-part mount 90 may be provided to attach the collars 20a, 20b to the bars 81, 82. The illustrated mount 90 has an upper portion 92 and a lower portion 94. The upper and lower portions 92, 94 may each have holes through them that align to allow mounting bolts 96 to pass through both portions 92, 94 and engage with the bars 81, 82. According to this embodiment, the mounting bolts 96 would both hold the upper and lower portions 92, 94 together around the collars 20a, 20b and attach the collars 20a, 20b to the respective bars 81, 82.

To prevent the collars 20a, 20b from moving in the axial direction relative to the mounts 90, a ridge 98 may be provided around the circumference of the collars 20a, 20b configured to mate with an annular groove 99 in the mounts 90. Thus, once the collars 20a, 20b are securely disposed within the mounts 90, the ridge 98 will be seated in the groove 99 and inhibit independent axial movement of the collars 20a, 20b with respect to the mounts 90.

Similarly, to prevent rotation of the collars 20a, 20b relative to the mounts 90, the outer surface of the collars 20a, 20b and/or the inner surface of the mounts 90 may be scored, grooved, sufficiently compressed by tightening, or any other method that may prevent rotation of the collars 20a, 20b relative to the mounts 90.

Once the collars 20a, 20b are mounted on the bars 81, 82, the track roller assembly 10 provides additional rigidity to the track roller frame assembly 550. As the retention plate 70 inhibits independent movement of the first and second collars 20a, 20b in the axial direction, the first and second bars 81, 82 are maintained at a substantially constant distance from one another proximate to the point at which the collars 20a, 20b are mounted; thereby adding an additional degree of stability to the track roller assembly 10.

Seals may be used to inhibit any solid lubricant from the self-lubricated bushing from escaping out of the clearance gaps 65a, 65b between the self-lubricated bushings 30a, 30b and the first and second ends 42a, 42b of the shaft 40, respectively, and also to inhibit debris from entering into the clearance gaps 65a, 65b. In one embodiment, a first seal 55a may be located between the first collar 20a and the first rim portion 42a of the shaft 40 along an axis 45 of the shaft 40 to seal off the clearance gap 65a. A second seal 55b may be located between the second collar 20b and the second rim portion 42b of the shaft 40 along the axis 45 of the shaft 40 to seal off the clearance gap 65b. The first and second seals 55a, 55b may be selected from a wide variety of seals, such as mechanical seals, duo cone seals or cassette seals. In one embodiment, the seals 55a, 55b may include a first member placed on each of the first shaft end 42a and second shaft end 42b, respectively, and a second member placed on each of the first collar 20a and the second collar 20b, respectively, with the two members rotating relative to each other by staying stationary on the first and second shaft ends 42a, 42b and the collars 20a, 20b, respectively. In addition, the seals 55a, 55b may use a liquid lubricant to remain lubricated or be made of a self-lubricated material.

The track roller assembly 10 defines a first spacing 60a between the first rim portion 43a of the shaft 40 and the first collar 20a and a second spacing 60b between the second rim portion 43b of the shaft 40 and the second collar 20b. The spacings 60a, 60b prevent the shaft 40, or rim portions 43a, 43b of the shaft 40, from rubbing against the collars 20a, 20b when the machine on which the track roller assembly 10 is positioned, is operating in extreme conditions.

The size of the spacings 60a, 60b may not be so large as to allow debris and other particles from entering into the track roller assembly 10. Therefore, the spacings 60a, 60b may be of a size that will allow the shaft 40 to rotate freely relative to the collars 20a, 20b even under extreme conditions when the shaft 40 is bending, and also inhibit any, if not all, of the debris from entering into the track roller assembly 10. In other embodiments of the disclosure, there may not be a need to maintain spacing because the shaft may be made without protruding rims or because there is minimal risk in the collars making any contact with the shaft. The first spacing 60a may be set by separating the first collar 20a from the first rim portion 43a of the shaft 40 by a first spacing distance. Similarly, the second spacing 60b may be set by separating the second collar 20b from the second rim portion 43b of the shaft 40 by a second spacing distance.

Those skilled in the art may contemplate the use of a seal, such as a labyrinth seal or a v-ring seal that may be positioned at or around the spacing 60a, to stop any debris from entering the track roller assembly 10.

The track roller assembly 10 may also include a first thrust washer 36a and a second thrust washer 36b to reduce the wear on the inner wall surfaces 23a, 23b of the collars 20a, 20b and the ends of the shaft 42a, 42b, as the worn material may hinder the rotational movement of the shaft 40 relative to the collars 20a, 20b. In a preferred embodiment of the present disclosure, the first thrust washer 36a is inserted between the first inner wall surface 23a of the first collar 20a and the first end 42a of the shaft 40. The second thrust washer 36b is inserted between the second inner wall surface 23b of the second collar 20b and the second end 42b of the shaft 40. The thrust washers 36a, 36b may or may not be attached to the collars 20a, 20b. Further, the thrust washers 36a, 36b may be made of the same or similar material used for the self-lubricating bushings. Those skilled in the art will recognize that the use of thrust washers 36a, 36b is optional and may be preferred to prevent damage to the surfaces of the shaft and the collars.

The track roller assembly 10 may have a portless outer surface 15 and a fluidless inner volume 18. An outer surface 15 of the track roller assembly 10 is defined by the entire outer surface of the track roller assembly including the outer surface of the shaft and the external surface of the collar. A portless outer surface means an outer surface of the track roller having no ports that may be used to add liquid lubricant to the track roller assembly. An inner volume 18 of the track roller assembly 10 is defined by the entire inner volume enclosed within the track roller assembly, including any volume inside the shaft, if any, and inside the self-lubricated bushings. A fluidless inner volume means an inner volume of the track roller assembly having no fluid lubricants at all. In the illustrated embodiment shown in FIG. 3, the shaft 40 is made from a solid piece and the inner volume 18 of the shaft 40 is not hollow. While a track roller assembly 10 that does not utilize fluid lubricants is disclosed, one having skill in the art will recognize that it would not be difficult to utilize fluid lubricants in the disclosed track roller assembly 10 and to provide ports therefor.

Figure 5:
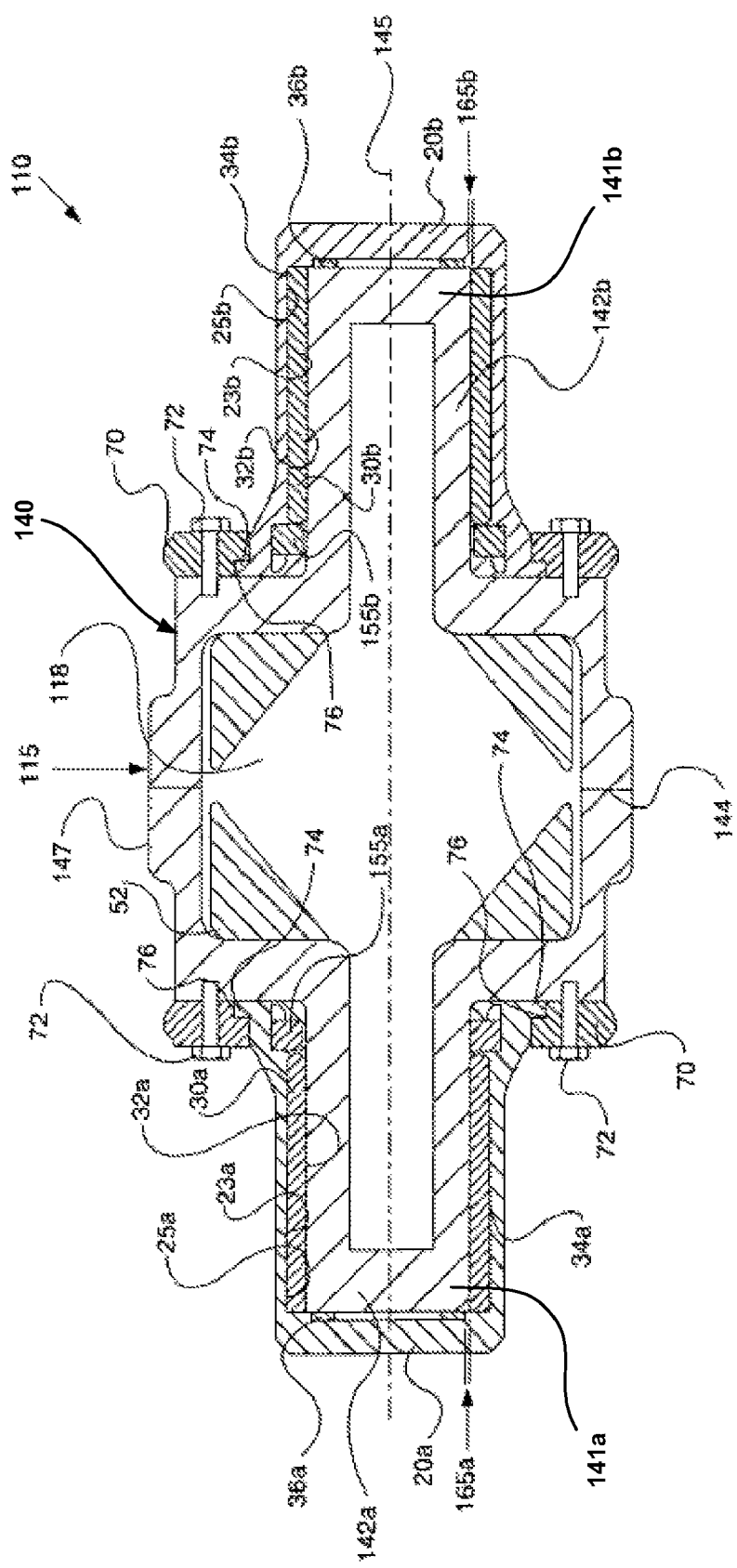
FIG. 5 is a sectioned front view of a track roller according to another embodiment of the present disclosure.

Referring now to FIG. 5, another exemplary embodiment of the present disclosure is shown. A track roller assembly 110 is similar to the track roller assembly 10 described in FIGS. 1, 2, 3 and 4 but has a different shaft configuration. In the exemplary embodiment shown in FIG. 5, the shaft 140 includes two identical shaft halves 141a, 141b that are attached together at a shaft joint 144 by friction welding or other similar methods of attachment. The shaft 140 includes a first end 142a and a second end 142b. It may be conceived by those skilled in the art that the shaft may come in different shapes, contours and may also be constructed in different manners. For instance, the shaft 140 may be made as a single piece, more than one piece in which the piece or pieces may even be solid or hollow. Those skilled in the art may appreciate that the shaft 140 may also be made from one solid piece sized to the right dimensions by lathing or other similar methods. The scope of the disclosure should not be limited to the embodiments described within the present disclosure, but should include other embodiments with alternate shaft designs that move a track that fall within the spirit of the disclosure.

In the illustrated embodiment shown in FIG. 5, the shaft 140 has a center guide flange 147 instead of rims. The center guide flange 147 may simplify the manufacturing process and may reduce the risk of shaft damage in extreme applications. The shaft 140 is hollow and contains an inner volume 118. The outer surface 115 of the shaft 140 is portless because there are no ports from which fluids may enter the track roller assembly. Furthermore, the inner volume 118 may be fluidless because there may be no liquid lubricant provided inside the volume 118. In the illustrated embodiment, the inner volume has internal support structures 52, such as brackets to prevent the inner volume cavity from collapsing under the stress. In another embodiment the shaft 140 may not include the inner volume 118 or the support structures 52. According to this embodiment, the shaft 140 may be substantially solid.

Similar to the embodiments illustrated in FIGS. 3 and 4, the embodiment illustrated in FIG. 5 may also include an annular retention plate 70 attached to the shaft 40, as described above, to maintain first and second collars 20a, 20b in close proximity to the shaft 40, while allowing the shaft 40 to rotate independently of the first and second collars 20a, 20b.

A first seal 155a is placed between the first collar 20a and the first shaft half 141a and a second seal 155b is placed between the second collar 20b and the second shaft half 141b, wherein both the seals 155a, 155b are placed along an axis 145 of the shaft 140. The seals 155a, 155b may be mechanical seals, cassette seals or may include a combination of seals which inhibit debris from entering the clearance between the shaft and the self-lubricated bushings as well as inhibit solid lubricant from leaving the clearance gaps 65a, 65b. Those skilled in the art understand that the use and assembling of seals in track roller assemblies is considered routine skill. It is intended that the scope of the present disclosure may not be limited to the embodiments described herein, but the scope includes other embodiments that include features that form the spirit of the present disclosure. For instance, a track roller assembly that has a hybrid liquid oil lubricant and self-lubricated bushings is one embodiment of a track roller assembly that also falls within the intended scope of the disclosure.

INDUSTRIAL APPLICABILITY

The present disclosure finds potential application in any track-type machine that uses track roller assemblies. The present disclosure may also find application in most types of track rollers, carrier rollers, idlers, excavators, track loaders or any system with an undercarriage.

Referring to FIGS. 1-5, the first and second collars 20a, 20b may attach to the first and second bars 81 and 82, respectively, via a mount 90 as described above. In operation, the shaft 40 of the track roller assembly 10 may rotate relative to the first and second collars 20a, 20b. The first and second ends 42a, 42b of the shaft 40 rotate inside the first and second self-lubricated bushings 30a, 30b while rubbing against their respective inner bearing surfaces 32a, 32b. There may be little or no rotation of the self-lubricated bushings 30a, 30b relative to the first and second collars 20a, 20b because the self-lubricated bushings 30a, 30b are tightly fit inside the inner cylindrical bores 25a, 25b of their respective collars 20a, 20b. In a preferred embodiment, the relative rotation between the self-lubricated bushings and the collars are further inhibited because the first and second inner wall surfaces 23a, 23b are scored. Nevertheless, versions that allow or even encourage relative rotation between the self-lubricated bushings and their respective collars are within the intended scope of the disclosure.

As illustrated in FIGS. 3-5, a retention plate 70 may be attached to the shaft 40 and rotate with the shaft 40, relative to the collars 20a, 20b. As the shaft 40 and retention plate 70 rotate, lips 74 coupled to the collars 20a, 20b are disposed within an annular recess 76 on the retention plate 70. The engagement of the lips 74 and the annular recesses 76 allow the shaft 40 and retention plate 70 to rotate independently of the collars 20a, 20b, while maintaining the collars 20a, 20b in a position proximate to the shaft 40.

It is also within the intended scope of the disclosure to produce track roller assemblies that have identical shaft halves. Even though manufacturing procedures may produce slight tolerance variations between the two halves, it is within the spirit of the disclosure that the two shaft halves function identically. Therefore, when describing the interaction of one end of the shaft and one bushing in one half of the track roller assembly, those skilled in the art will appreciate that the description applies to the interaction of the other end of the shaft and the other bushing as well.

As the shaft 40 rotates relative to the first inner bearing surface 32a of the first self-lubricated bushing 30a, the first inner bearing surface 32a wears the substrate carrying solid lubricant, exposing the lubricant to the first end 42a of the shaft 40 and thereby lubricating the area between the first end 42a of the shaft 40 and the first inner bearing surface 32a of the self-lubricated bushing 30a. The substrate that may wear off the inner bearing surface 32a of the bushing 30a remains within the clearance gap 65a between the first end 42a of the shaft 40 and the first self-lubricated bushing 30a because the seal 55a inhibits the lubricant from escaping to the other parts of the track roller assembly. Also, the seal 55a inhibits the entry of any debris from entering the clearance gap 65a between the shaft 40 and the self-lubricated bushing 30a. The seal 55a may be placed on the end of the shaft, or the self-lubricated bushing or the collar, or on any combination of the shaft, self-lubricated bushing and collar.

The type of seal used and the method of assembling the seal in the track roller assembly may be appreciated by those skilled in the art to fall within the standard of routine skill and knowledge. In addition, the seal may require some external lubrication such as oil or grease, or may be made of a self-lubricated material such as the ones used for the self-lubricated bushings. The use of lubricants to lubricate the seal falls within the intended scope of the disclosure.

In an exemplary embodiment, the track roller assembly 10 may contain no lubrication ports for lubricating the track roller assembly 10 and may have no fluid lubricants inside the track roller assembly 10. Because there may be no external lubrication required, the design may be more durable and reliable as it reduces the risk of any leakage of the fluid from either the lubrication port plug becoming loose or through damage to the track roller assembly in general. Additionally, the track roller design may eliminate the need of having a lubricant port, which may eliminate the cost associated with manufacturing a design incorporating the port and a lubricant volume chamber. In one embodiment of the disclosure, because the track roller assembly may be made of two identical halves, the manufacturing of such a track roller design may be less costly, less complicated and more robust than track roller assembly designs in the past. The time and expense spent on maintenance of self-lubricated bushings in a track roller assembly may be reduced.

It should be understood that the above description is indeed for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A track roller assembly comprising:
   a first collar having a first inner wall surface and a first lip;
   a second collar having a second inner wall surface and a second lip;
   a shaft having a first end, a second end, and an axis, the first end being disposed within the first collar and the second end being disposed within the second collar;
   a first retention plate being fixed with respect to the shaft; and
   a second retention plate being fixed with respect to the shaft;
   wherein the first lip is restrained from axial movement along the axis by the first retention plate; the second lip is restrained from axial movement along the axis by the second retention plate; and the shaft, the first retention plate, and the second retention plate are rotatable relative to the first collar and the second collar.

2. The track roller assembly of claim 1, further comprising:
   a first self-lubricated bushing having a first inner bearing surface and a first outer surface, the first outer surface being in contact with the first inner wall surface, and the first inner bearing surface being in contact with the first end; and
   a second self-lubricated bushing having a second inner bearing surface and a second outer surface, the second outer surface being in contact with the second inner wall surface, and the second inner bearing surface being in contact with the second end.

3. The track roller assembly of claim 1, wherein the first retention plate and the second retention plate are bolted to the shaft.

4. The track roller assembly of claim 2, wherein the first and second self-lubricated bushings include a substrate carrying a solid lubricant.

5. The track roller assembly of claim 4, wherein the track roller assembly includes a portless outer surface and a fluidless inner volume.

6. The track roller assembly of claim 1, further comprising:
   a first mount having a first upper portion and a first lower portion, wherein the first collar is disposed between the first upper portion and the first lower portion;
   a second mount having a second upper portion and a second lower portion, wherein the second collar is disposed between the second upper portion and the second lower portion.

7. The track roller assembly of claim 6, wherein the first mount restrains the first collar from axial movement along the axis and rotation about the axis; and the second mount restrains the second collar from axial movement along the axis and rotation about the axis.

8. The track roller assembly of claim 6, further comprising:
   a track frame;
   wherein the first mount and the second mount are coupled to the track frame.

9. The track roller assembly of claim 6, further comprising:
   a track frame having a first track bar and a second track bar;
   wherein the first mount is coupled to the first track bar and the second mount is coupled to the second track bar; and
   wherein the first track bar proximate to the first mount and the second track bar proximate to the second mount are maintained at a substantially constant distance by the combination of the shaft, the first mount, the second mount, the first retention plate, and the second retention plate.

10. The track roller assembly of claim 2, further comprising:
    a first thrust washer between the first end of the shaft and the first collar; and
    a second thrust washer between the second end of the shaft and the second collar.

11. A track type machine comprising:
    a track roller frame having a first bar and a second bar separated by a roller receiving gap;
    a plurality of track roller assemblies, each of the plurality of track roller assemblies including:
        a first collar having a first inner wall surface and a first lip;
        a second collar having a second inner wall surface and a second lip;
        a shaft having a first end, a second end, and an axis, the first end being disposed within the first collar and the second end being disposed within the second collar; and
        a first retention plate being fixed with respect to the shaft; and
        a second retention plate being fixed with respect to the shaft;
        wherein the first lip is restrained from axial movement along the axis by the first retention plate; the second lip is restrained from axial movement along the axis by the second retention plate; and the shaft, the first retention plate, and the second retention plate are rotatable relative to the first collar and the second collar.

12. The track type machine of claim 11, wherein the first retention plate and the second retention plate are bolted to the shaft.

13. The track type machine of claim 11, wherein each of the plurality of track roller assemblies further comprises:
    a first self-lubricated bushing having a first inner bearing surface and a first outer surface, the first outer surface in contact with the first inner wall surface of the first collar; and
    a second self-lubricated bushing having a second inner bearing surface and a second outer surface, the second outer surface in contact with the second inner wall surface of the second collar.

14. The track type machine of claim 13, wherein each of the plurality of track roller assemblies further comprises:
    a first thrust washer between the first end of the shaft and the first collar; and
    a second thrust washer between the second end of the shaft and the second collar.

15. A method of assembling a track roller assembly, comprising the steps of:
    (i) press fitting a first bushing to a first cylindrical bore of a first collar, the first collar having a first lip;
    (ii) press fitting a second bushing to a second cylindrical bore of a second collar, the second collar having a second lip;
    (iii) inserting a first end of a shaft into the first cylindrical bore of the first collar to contact a first inner bearing surface of the first bushing, the shaft having an axis;
    (iv) inserting a second end of the shaft into the second cylindrical bore of the second collar to contact a second inner bearing surface of the second bushing;
    (v) sliding a first retention plate over the first collar until the first retention plate is in contact with the shaft;
    (vi) sliding a second retention plate over the second collar until the second retention plate is in contact with the shaft;
    (vii) attaching the first retention plate to the shaft; and
    (viii) attaching the second retention plate to the shaft.

16. The method of claim 15, wherein the first bushing and the second bushing are self-lubricating.

17. The method of claim 15, wherein the step of attaching the first retention plate to the shaft includes the step of restraining the first collar from axial movement along the axis.

18. The method of claim 15, wherein steps (i), (iii), (v), and (vii) are performed in numerical order.

19. The method of claim 15, further including the steps of:
    (ix) constraining the first collar between a first upper portion and a first lower portion of a first mount;
    (x) constraining the second collar between a second upper portion and second lower portion of a second mount.

20. The method of claim 19, wherein step (v), (vii) and (ix) are performed in numerical order.

* * * * *